United States Patent
Wu

(10) Patent No.: US 9,568,761 B2
(45) Date of Patent: Feb. 14, 2017

(54) ARRAY SUBSTRATE, LIQUID CRYSTAL DISPLAY PANEL AND LIQUID CRYSTAL DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventor: Hao Wu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/948,121

(22) Filed: Nov. 20, 2015

(65) Prior Publication Data

US 2016/0327820 A1 Nov. 10, 2016

(30) Foreign Application Priority Data

May 8, 2015 (CN) .......................... 2015 1 0232142

(51) Int. Cl.
G02F 1/1335 (2006.01)
G02F 1/1333 (2006.01)
G02F 1/1362 (2006.01)
G02F 1/1368 (2006.01)

(52) U.S. Cl.
CPC ......... *G02F 1/13338* (2013.01); *G02F 1/1368* (2013.01); *G02F 1/133512* (2013.01); *G02F 1/133514* (2013.01); *G02F 1/136286* (2013.01)

(58) Field of Classification Search
None
See application file for complete search history.

(56) References Cited

U.S. PATENT DOCUMENTS

2013/0162570 A1* 6/2013 Shin .................... G06F 3/041
345/173

* cited by examiner

*Primary Examiner* — Richard Kim
(74) *Attorney, Agent, or Firm* — Faegre Baker Daniels LLP

(57) ABSTRACT

An array substrate, a liquid crystal display panel and a liquid crystal display device. The array substrate includes: a plurality of pixel units defined by a plurality of intersecting data lines and scanning lines, wherein each of the plurality of pixel units comprises a thin film transistor and a pixel electrode electrically connected with the thin film transistor; a plurality of common electrode blocks disposed in a layer different from the pixel electrode, the common electrode blocks being reused as touch electrodes; a plurality of sensing lines, each of which is electrically connected with one of the common electrode blocks; and a plurality of auxiliary electrodes disposed in the same layer as the pixel electrode, wherein each of the plurality of auxiliary electrodes is disposed between two adjacent pixel electrodes, and overlapped and electrically connected with one of the sensing lines.

12 Claims, 12 Drawing Sheets

ARRAY SUBSTRATE, LIQUID CRYSTAL DISPLAY PANEL AND LIQUID CRYSTAL DISPLAY DEVICE

CROSS-REFERENCE TO RELATED APPLICATION

This application claims priority to Chinese Application No. 201510232142.5, filed May 8, 2015, which is herein incorporated by reference in its entirety.

TECHNICAL FIELD

The present disclosure relates to a display device and, in particular, to an array substrate, a liquid crystal display panel and a liquid crystal display device.

BACKGROUND

Due to their advantages such as good portability and low power consumption, Liquid Crystal Displays (LCDs) have been widely used in various display devices such as smartphones, notebooks and monitors.

Currently, touch panels include Add-on type touch panels, On-Cell touch panels and In-cell touch panels depending on different positions of touch electrodes. The Add-on type cell touch screens are manufactured by directly disposing touch electrodes onto an outside surface of the LCD, which causes a larger overall thickness of the touch panel and decreases the light transmittance of the touch panel. The On-Cell touch panels are manufactured by disposing touch electrodes at an outside of a color filter substrate of the LCD, which decreases the overall thickness of the touch panel, but increases manufacturing processes for the color filter substrate. The In-cell touch panels are manufactured by reusing a common electrode of the LCD as touch electrodes, without an increase of the overall thickness of the touch panel, and the touch electrodes are obtained simultaneously when the common electrode of the LCD is manufactured, without additional manufacturing processes.

An array substrate of an existing self-capacitive In-cell touch panel includes pixel electrodes and a plurality of common electrode blocks separated from the pixel electrodes. In a liquid crystal display with a high resolution and a large size, the load on the common electrode is significant. Since the pixel electrodes and the common electrode blocks are disposed in different layers, the layer where the pixel electrodes are located might be misaligned with the layer where the common electrode blocks are located, which causes non-uniform electric fields formed between different pixel electrodes and the common electrode blocks, thereby decreasing the luminance of the liquid crystal display panel.

SUMMARY

In order to solve the above problems, the present disclosure provides an array substrate, including:
- a plurality of scanning lines;
- a plurality of data lines intersected with the scanning lines;
- a plurality of pixel units defined by the data lines and the scanning lines, wherein each of the plurality of pixel units comprises a thin film transistor and a pixel electrode electrically connected with the thin film transistor;
- a plurality of common electrode blocks disposed in a layer different from the pixel electrode, the common electrode blocks being reused as touch electrodes;
- a plurality of sensing lines, each of which is electrically connected with one of the common electrode blocks; and
- a plurality of auxiliary electrodes disposed in the same layer as the pixel electrode, wherein each of the plurality of auxiliary electrodes is disposed between two adjacent pixel electrodes, and overlapped and electrically connected with one of the sensing lines.

The disclosure further provides a liquid crystal display panel, including a color filter substrate, an array substrate disposed opposite to the color filter substrate and a liquid crystal layer disposed between the color filter substrate and the array substrate, wherein, the array substrate is selected from the array substrate in any of the embodiments of the disclosure.

The disclosure further provides a liquid crystal display device, including the liquid crystal display panel in any of the embodiments of the disclosure and a drive chip configured for display driving and touch driving of the liquid crystal display panel.

The luminance of a liquid crystal display panel including the array substrate of the disclosure is improved by means of the electric field formed between the auxiliary electrode and the pixel electrode, and because the auxiliary electrode is electrically connected with the sensing line overlapped by the auxiliary electrode, the resistance of the sensing line is decreased, thereby decreasing the load of the common electrode in the liquid crystal display panel.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate the technical solutions of the embodiments of the disclosure, the drawings used for the description of the embodiments are briefly introduced below. Obviously, the drawings for the following description only show some embodiments of the disclosure, and other drawings may also be obtained from the described drawings.

Figure 1A:
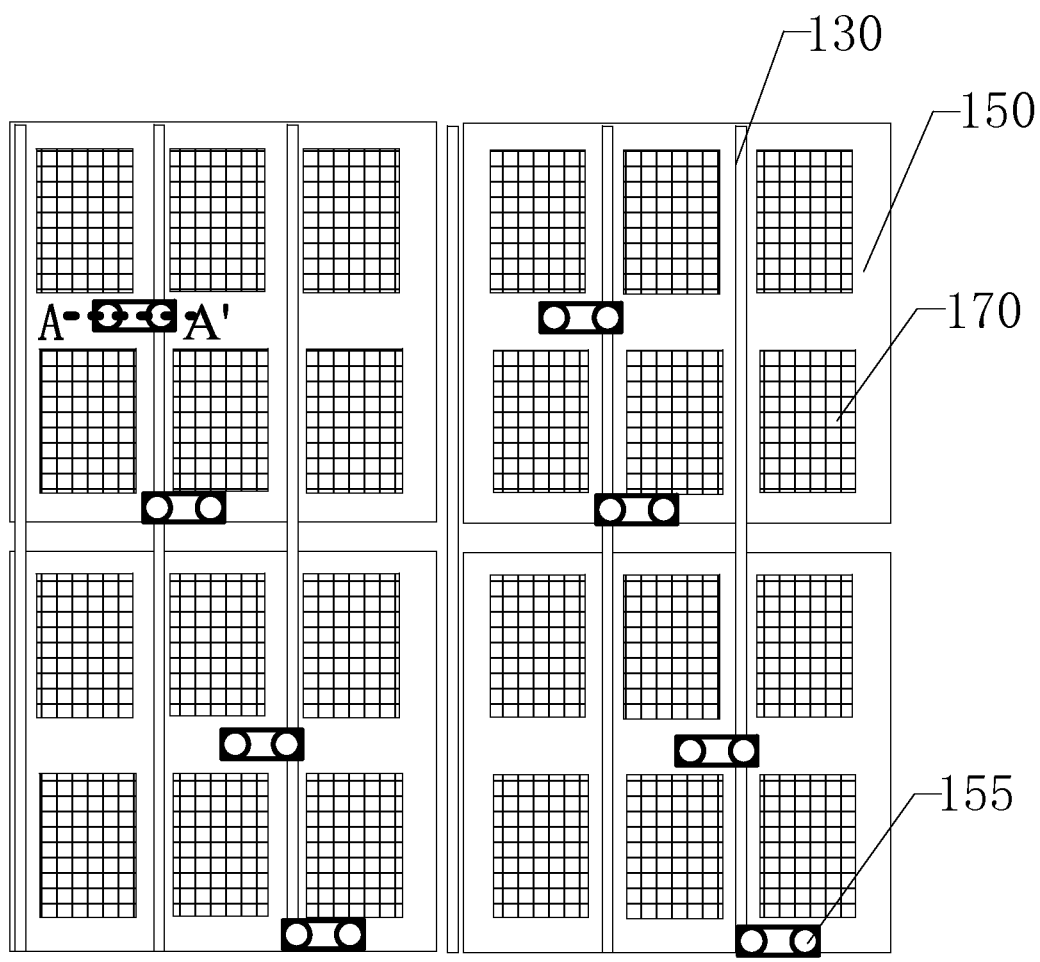
FIG. 1A is a schematic partial top view of an array substrate in an existing self-capacitive in-cell touch panel.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In order to make the objects, technical solutions and advantages of the disclosure more clear, the technical solutions of the disclosure are clearly and completely described below with reference to the drawings of the disclosure. Obviously, merely some instead of all embodiments of the disclosure are described herein. All other embodiments obtained in light of the described embodiments of the disclosure fall within the scope of the disclosure.

In embodiments, the technical solutions are suitable for the case that common electrode blocks are reused (or driven) as touch electrodes. The array substrate includes a plurality of auxiliary electrodes electrically connected with sensing lines, and the auxiliary electrodes can not only improve the luminance of a liquid crystal display panel, but also decrease the load of the common electrode.

Figure 1B:
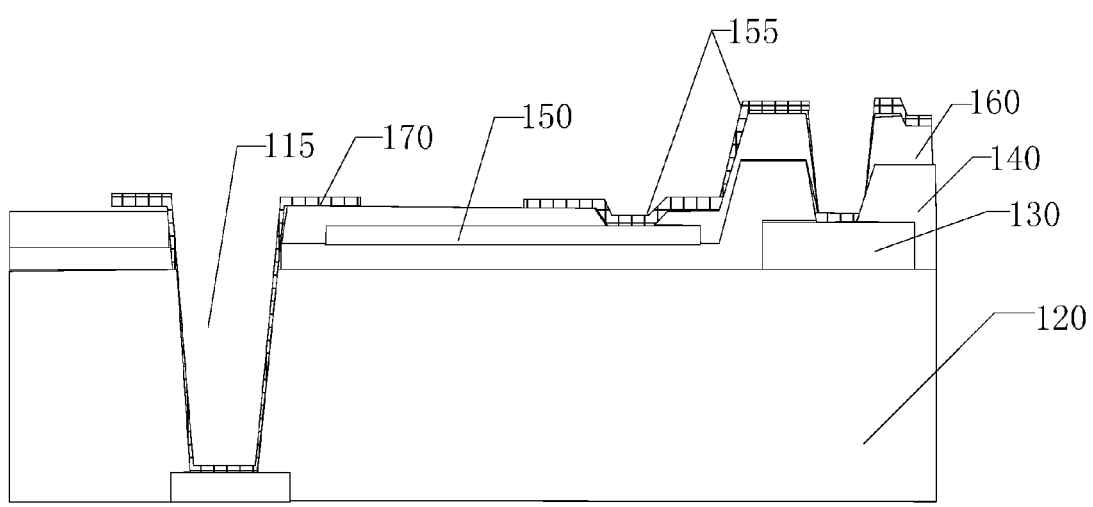
FIG. 1B is a cross-sectional view of the array substrate along a line A-A' in FIG. 1A.

FIG. 1A is a schematic partial top view of an array substrate in an existing self-capacitive in-cell touch panel, and FIG. 1B is a cross-sectional view of the array substrate taken along a line A-A' in FIG. 1A. With reference to both FIGS. 1A and 1B, the array substrate includes a plurality of common electrode blocks 150 for sensing a user touch and a plurality of sensing lines 130, and each of the sensing lines 130 is electrically connected with corresponding one of the common electrode blocks 150. In particular, the sensing line 130 is electrically connected with the corresponding common electrode block 150 by a bridging structure 155, which is formed in the same metal layer as pixel electrodes 170, and the pixel electrode 170 is connected with a drain electrode of a thin film transistor by a drain electrode contact hole 115.

Figure 1C:
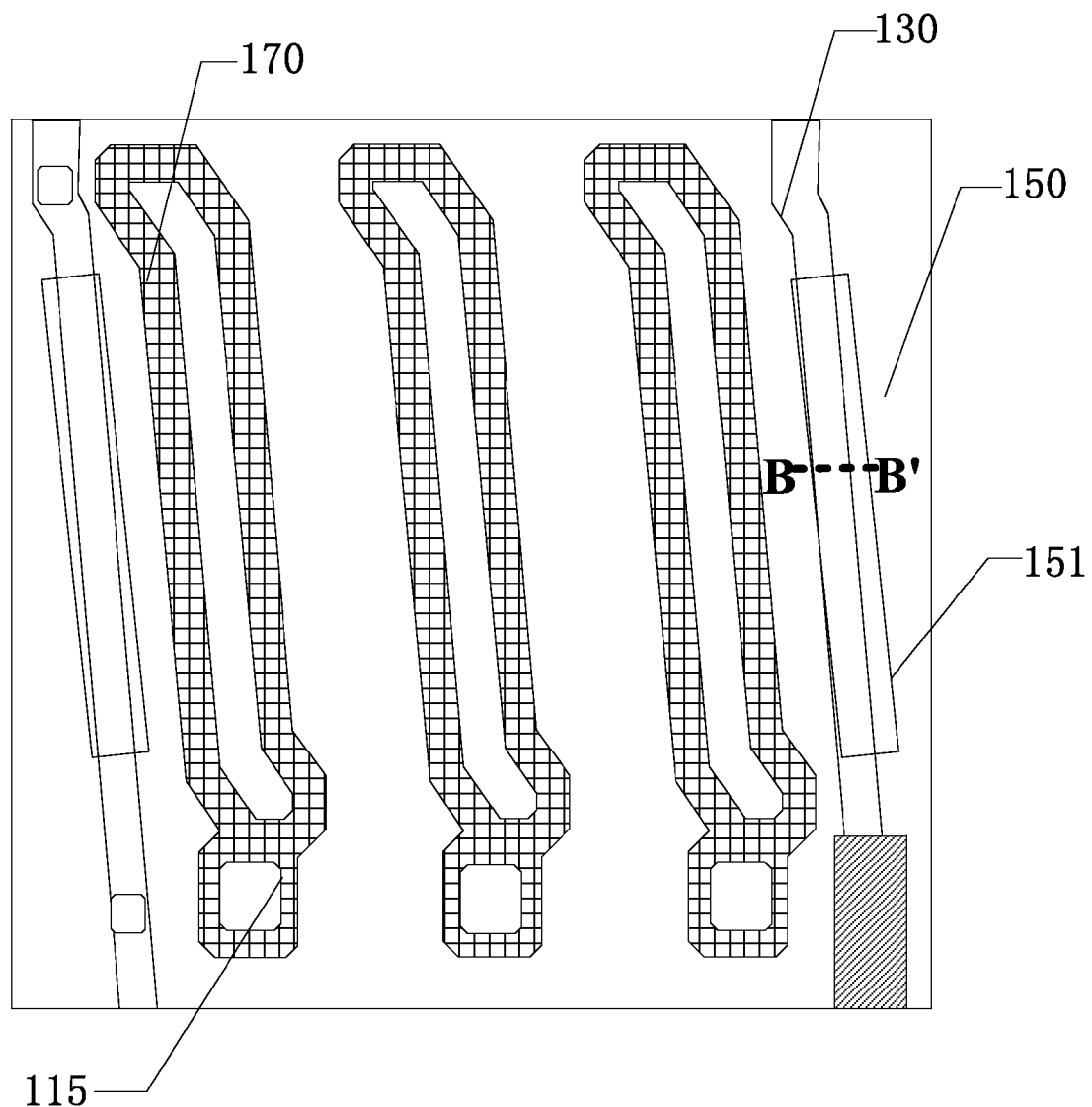
FIG. 1C is a schematic partial top view of the existing array substrate suffering from misalignment.
Figure 1D:
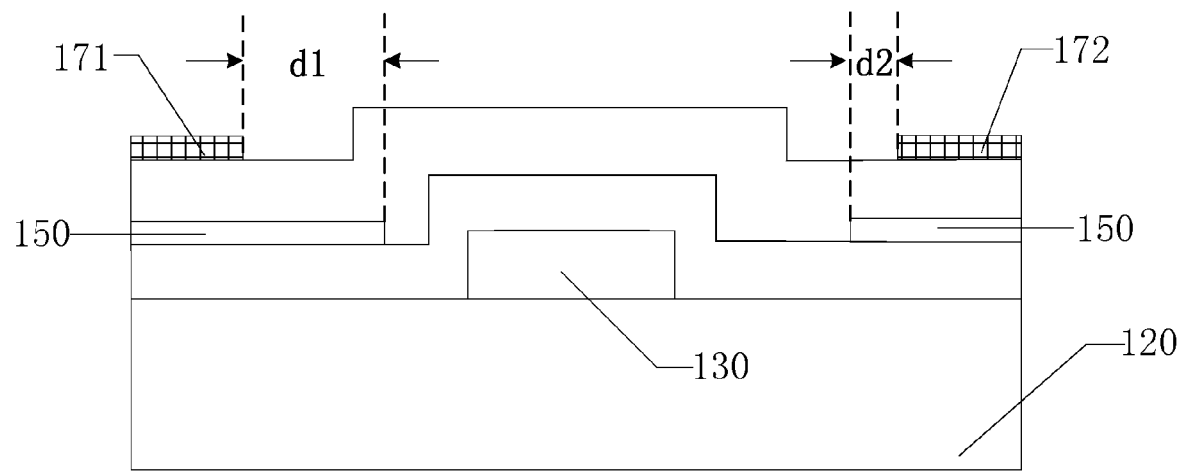
FIG. 1D is a cross-sectional view of the existing array substrate along a line B-B' in FIG. 1C.

FIG. 1C is a schematic partial top view of the existing array substrate suffering from misalignment, and FIG. 1D is a cross-sectional view of the existing array substrate along a line B-B' in FIG. 1C. With reference to both FIGS. 1C and 1D, the common electrode block 150 further includes slits 151, and the slit 151 overlaps a portion of the sensing line 130 not in contact with the common electrode block 150. If a pixel electrode layer where the pixel electrode 170 is located is misaligned with a common electrode layer where the common electrode block 150 is located, given that a distance between the common electrode block 150 and a first pixel electrode 171 adjacent to the common electrode block 150 in a direction parallel to a plane of the substrate 120 is denoted by d1 and a distance between the common electrode block 150 and a second pixel electrode 172 adjacent to the common electrode block 150 in a direction parallel to a plane of the substrate 120 is denoted by d2, then d1 is smaller than d2, so that an electric field formed between the first pixel electrode 171 and the common electrode block 150 is stronger than that formed between the second pixel electrode 172 and the common electrode block 150, thus the luminance of a pixel unit including the first pixel electrode 171 differs from that of a pixel unit including the second pixel electrode 172, thereby decreasing the luminance of the liquid crystal display panel.

In order to avoid the decrease in the luminance of the liquid crystal display panel caused by the misalignment between the pixel electrode layer and the common electrode layer, the present disclosure provides an array substrate.

Figure 2A:
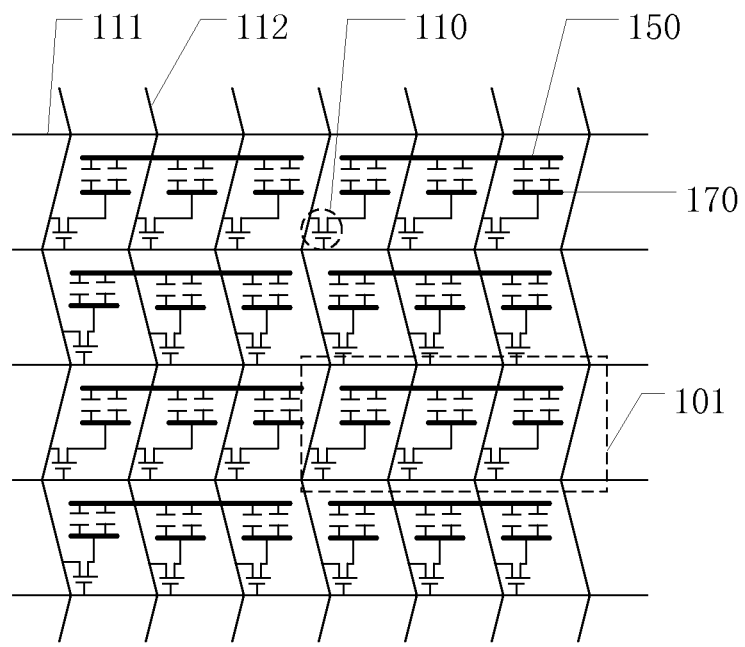
FIG. 2A is a schematic diagram showing the structure of an array substrate, according to embodiments of the disclosure.
Figure 2B:
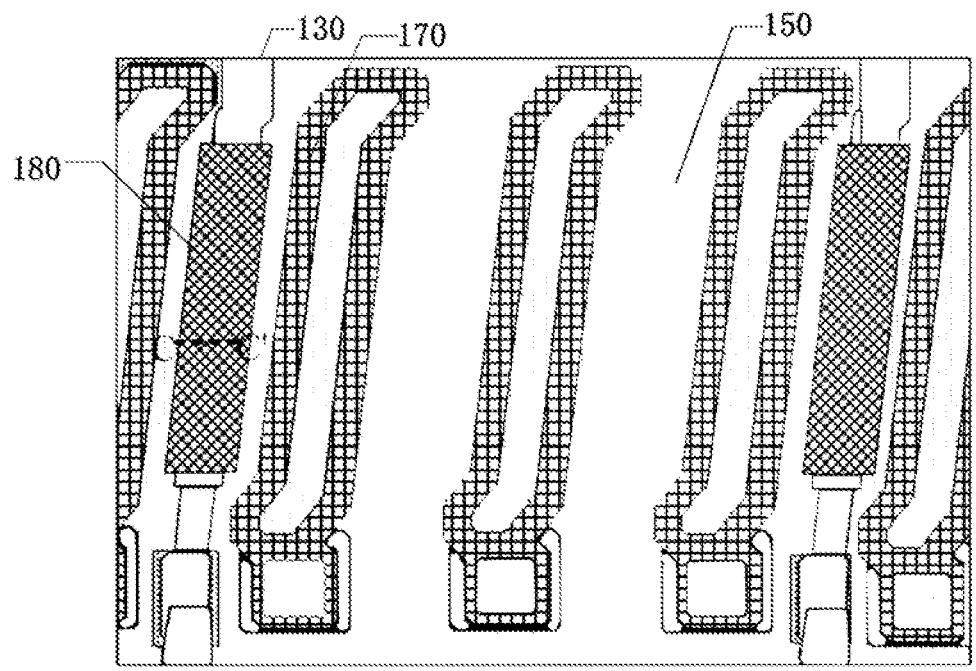
FIG. 2B is a schematic top view of a region 110 in FIG. 2A.

FIG. 2A is a schematic top view of an array substrate, according to embodiments of the disclosure. As shown in FIG. 2A, the array substrate includes: scanning lines 111; data lines 112 intersecting the scanning lines; a plurality of pixel units defined by the scanning lines and the data lines, where each of the pixel units includes a thin film transistor 110 and a pixel electrode 170 electrically connected with the thin film transistor 110; a plurality of common electrode blocks 150 disposed in a layer different from a layer in which the pixel electrodes 170 are disposed, where the common electrode blocks 150 are reused as touch electrodes. Referring to FIG. 2B, which is a schematic top view of a region 110 in FIG. 2A, and the array substrate further includes a plurality of sensing lines 130, each of which is electrically connected with one of the common electrode blocks 150. The array substrate further includes a plurality of auxiliary electrodes 180 disposed in the same layer as the pixel electrodes 170, with the auxiliary electrode 180 being disposed between two adjacent pixel electrodes 170. Each of the auxiliary electrodes 180 overlaps and is electrically connected with one of the sensing lines 130.

The thin film transistor, which is used as a switch element, includes a gate electrode, a semiconductor layer, a source electrode and a drain electrode. The thin film transistor may have a bottom-gate configuration in which the gate electrode is below the semiconductor layer, or may have a top-gate configuration in which the gate is above the semiconductor layer. The pixel electrode is electrically connected with the drain electrode of the thin film transistor via a drain contact hole.

An electric field may be formed between the common electrode block 150 and the pixel electrode 170 to drive liquid crystal molecules to rotate, thereby controlling light transmittance. Further, the common electrode block 150, which is patterned, is further used as a sensing electrode for sensing a position of a user touch. Each of the common electrode blocks 150 can have a size corresponding to that of one or more pixel units, i.e., a projection of the one or more pixel electrodes 170 in a direction perpendicular to the common electrode block 150 falls within the same common electrode block 150.

Figure 2C:
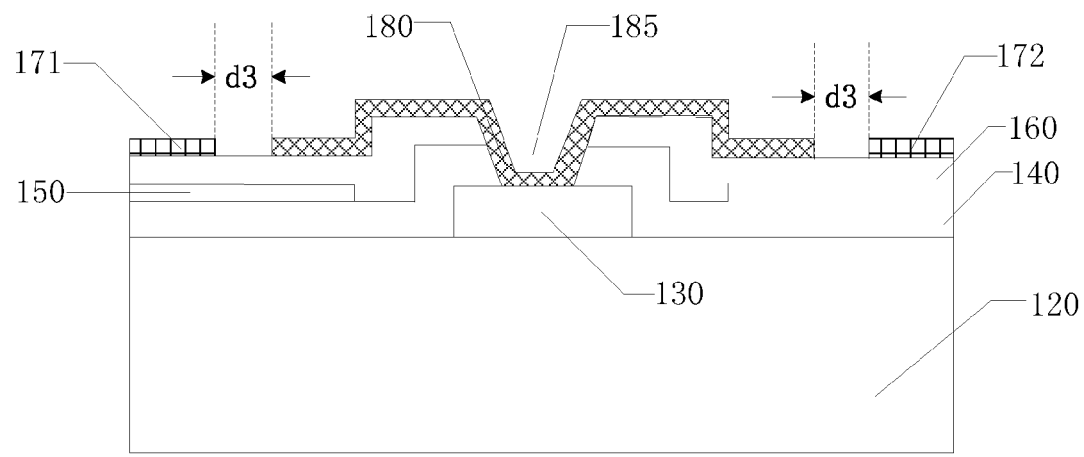
FIG. 2C is a cross-sectional view of the array substrate along a line C-C' in FIG. 2B.

FIG. 2C is a cross-sectional view of the array substrate along a line C-C' in FIG. 2B. As shown in FIG. 2C the auxiliary electrode 180 is electrically connected with the sensing line 130 (overlapped by the auxiliary electrode 180) via a slot 185. Since each of the sensing lines 130 is further electrically connected with the corresponding common electrode block 150, the auxiliary electrode 180 is at the same electric potential as the common electrode block 150, so that there is also an electric potential difference between the auxiliary electrode 180 and the pixel electrode 170, i.e., an electric field is also formed between the auxiliary electrode 180 and the pixel electrode 170, to enhance the rotation of the liquid crystal molecules, thereby improving luminance of the liquid crystal display panel incorporating the array substrate.

As shown in FIG. 2C, the auxiliary electrode 180 and the pixel electrode 170 are disposed in the same layer and hence can be simultaneously manufactured, so that a distance between the auxiliary electrode 180 and the adjacent pixel electrode 170 in a direction parallel to a plane of the array substrate 120 may be well controlled during the manufacture of the pixel electrode.

In an implementation, the distance between the auxiliary electrode 180 and the adjacent pixel electrode 170 is identical. As shown in FIG. 2C, the auxiliary electrode 180 is spaced from any of two pixel electrodes 170 adjacent to the auxiliary electrode 180 by a distance d3, so that the intensity of an electric field formed between the auxiliary electrode 180 and any of the two pixel electrodes 170 adjacent to the auxiliary electrode 180 is identical, thereby the intensity increase of the electric field at the pixel unit including any of the adjacent pixel electrodes 170 caused by the auxiliary electrode 180 is identical, improving luminance of the liquid crystal display panel incorporating the array substrate and the consistency of the luminance of pixel units.

The common electrode layer where the common electrode blocks 150 are located is above a metal layer where the sensing lines 130 are located, the pixel electrode layer where the pixel electrodes 170 are located is above the common electrode layer, a first insulation layer 140 is disposed between the sensing line layer and the common electrode layer, and a second insulation layer 160 is disposed between the pixel electrode layer and the common electrode layer. The auxiliary electrode 180 is disposed in a layer same as the pixel electrode layer and is electrically connected with the sensing line 130 overlapped by the auxiliary electrode 180 via the slot 185 penetrating through the second insulation layer 160, the common electrode layer and the first insulation layer 140. The first insulation layer 140 and the second insulation layer 160 both can be made of silicon oxide or silicon nitride.

In order to make the electric field formed between the pixel electrode 170 and the adjacent auxiliary electrode 180 uniform, each of the auxiliary electrodes 180 is extended along an extending direction (i.e. a longitudinal direction) of the sensing line 130 by the same length.

In order to enhance the intensity of the electric field formed between the pixel electrode 170 and the auxiliary electrode 180, the length of the auxiliary electrode 180 in the extending direction of the sensing line 130 is larger than or equal to that of the pixel electrode 170 in the extending direction of the sensing line 130. If the pixel electrode 170 includes an intermediate region and an inclining end region, the length of the auxiliary electrode 180 in the extending direction of the sensing line 130 is larger than or equal to that of the intermediate region in the extending direction of the sensing line 130.

A distance between the auxiliary electrode 180 and the pixel electrodes 170 adjacent to the auxiliary electrode 180 in a direction parallel to a plane of the array substrate 120 is larger than or equal to 2 μm, thus, the auxiliary electrode 180 is not overlapped with the adjacent pixel electrode 170.

In order to prevent a decrease of the aperture ratio caused by the sensing line 130 or the auxiliary electrode 180, the orthographic projection of the sensing line 130 onto the array substrate is within the orthographic projection of the data line or scanning line onto the array substrate.

Figure 2D:
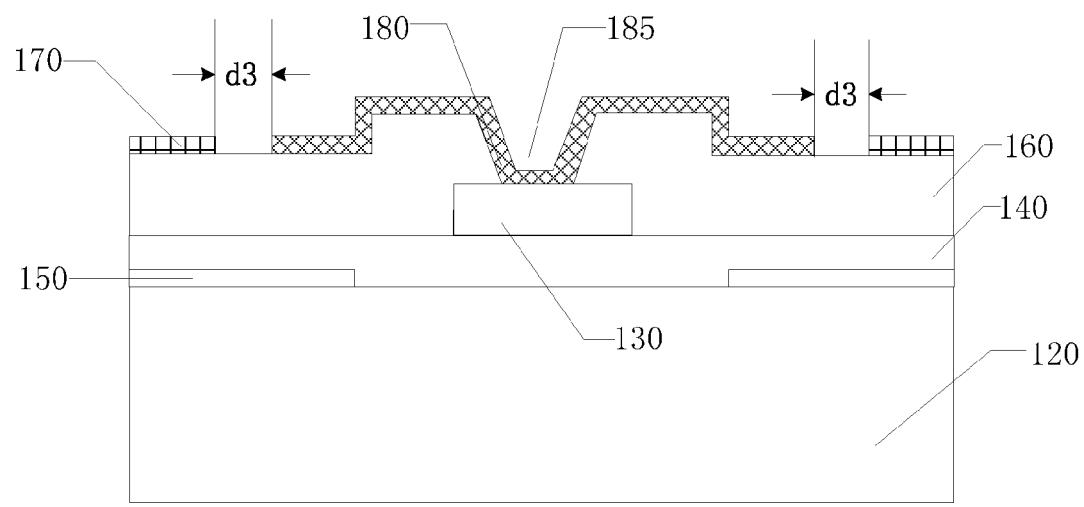
FIG. 2D is another cross-sectional view of the array substrate along a line C-C' in FIG. 2B.

FIG. 2D is another cross-sectional view of the array substrate along the line C-C' in FIG. 2A. As shown in FIG. 2D, a metal layer where the sensing lines 130 are located is above the common electrode layer, the pixel electrode layer where the pixel electrode 170 is located is above the sensing line layer, a first insulation layer 140 is disposed between the sensing line layer and the common electrode layer, and a second insulation layer 160 is disposed between the pixel electrode layer and the sensing line layer. The auxiliary electrode 180 is electrically connected with the sensing line 130 overlapped by the auxiliary electrode 180 via the slot 185 penetrating through the second insulation layer 160. It is noted that the array substrate in FIG. 2D has the same structure as the array substrate in FIG. 2C, except for different relative positions of the common electrode layer, the metal layer where the sensing lines 130 are located and the pixel electrode layer, thus specific illustration of the same parts is omitted.

It is noted that each of the sensing lines is electrically connected with one of the auxiliary electrodes in the array substrate provided by the present disclosure, thereby decreasing resistance of the sensing line by means of the auxiliary electrode connected in parallel with the sensing line, and in turn reducing the load of the common electrode block electrically connected with the sensing line.

As such, the luminance of a liquid crystal display panel including the array substrate of the present disclosure is improved by means of the electric field formed between the auxiliary electrode and the pixel electrode, and because the auxiliary electrode is electrically connected with the sensing line overlapped by the auxiliary electrode, the resistance of the sensing line is decreased, thereby decreasing the load of the common electrode in the liquid crystal display panel.

The light transmittance of the array substrate provided by the present disclosure is compared with that of the existing array substrate as follows.

Figure 3A:
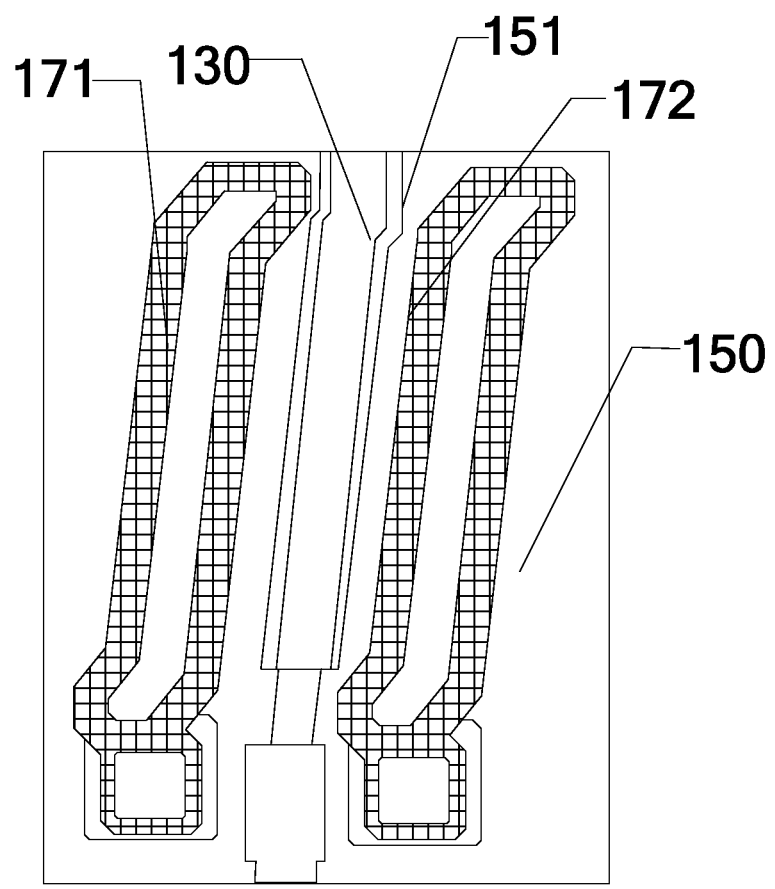
FIG. 3A is a partial top view of the existing array substrate in which the common electrode layer is aligned with the pixel electrode layer.
Figure 3B:
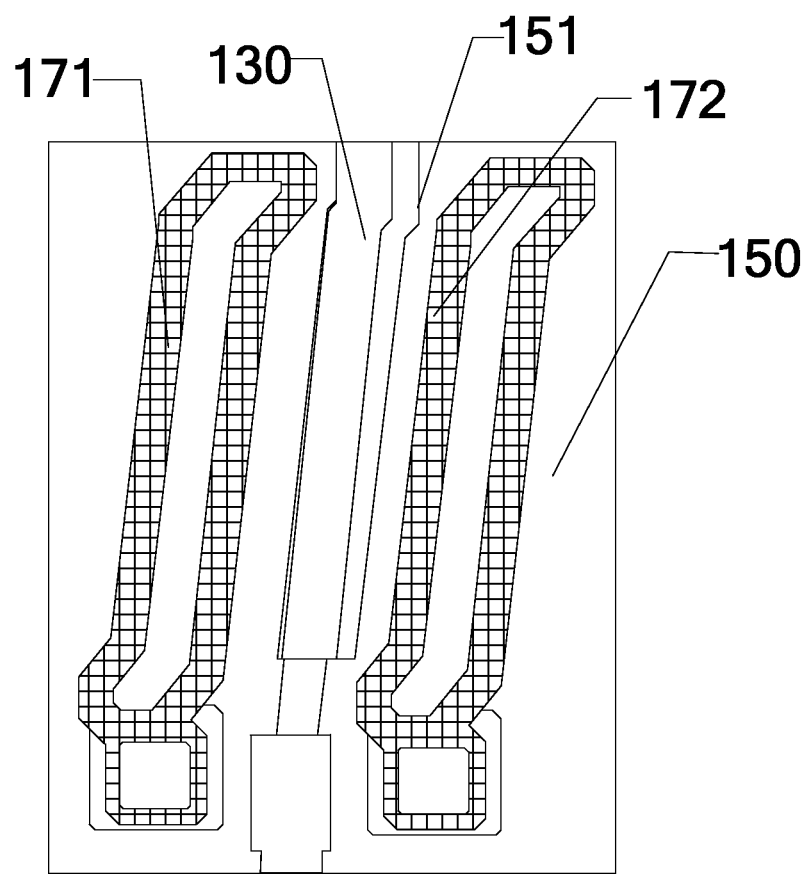
FIG. 3B is a partial top view of the existing array substrate in which the common layer is misaligned with the pixel electrode layer.

FIG. 3A is a partial top view of the existing array substrate in which the common electrode layer is aligned with the pixel electrode layer; FIG. 3B is a partial top view of the existing array substrate in which the common layer is misaligned with the pixel electrode layer; and FIG. 3C is a partial top view of the array substrate in which the common electrode layer is misaligned with the pixel electrode layer, according to embodiments of the disclosure.

As shown in FIG. 3A, the existing array substrate includes common electrode blocks 150, sensing lines 130, and slits 151 overlapped with the sensing lines 130, and a first pixel electrode 171 and a second pixel electrode 172 are disposed adjacent to the sensing line 130. A projection of the first pixel electrode 171 onto the common electrode block 150 in the direction perpendicular to the common electrode block 150 is symmetric, with respect to the slit 151, with that of the second pixel electrode 172 onto the common electrode block 150 in the direction perpendicular to the common electrode block 150, i.e., the common electrode layer where the common electrode block is located is aligned with the pixel electrode layer where the pixel electrode is located.

As shown in FIG. 3B, the existing array substrate includes common electrode blocks 150, sensing lines 130, and slits 151 overlapped with the sensing lines 130, and a first pixel electrode 171 and a second pixel electrode 172 are disposed adjacent to the sensing line 130. A distance between the slit 151 and a projection of the first pixel electrode 171 onto the common electrode block 150 in the direction perpendicular to the common electrode block 150 is 0.5 μm larger than that between the slit 151 and a projection of the second pixel electrode 172 onto the common electrode block 150 in the direction perpendicular to the common electrode block 150, i.e., the common electrode layer is misaligned with the pixel electrode layer.

Figure 3C:
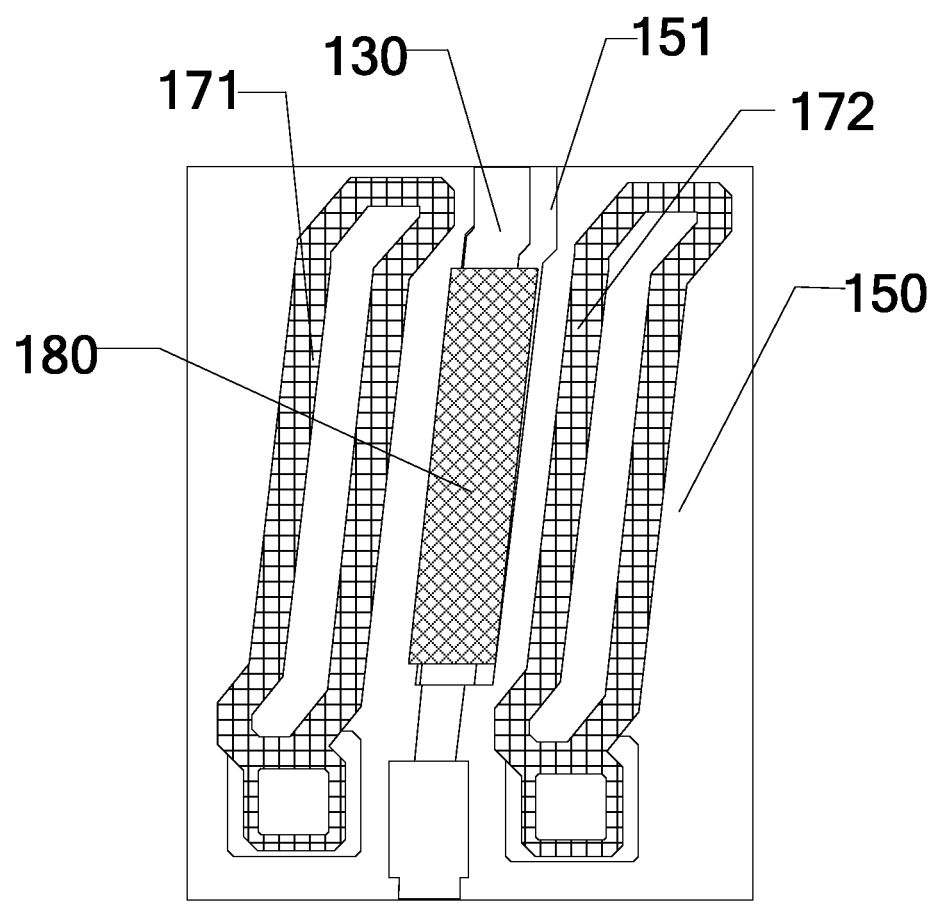
FIG. 3C is a partial top view of the array substrate in which the common electrode layer is misaligned with the pixel electrode layer, according to embodiments of the disclosure.

As shown in FIG. 3C, the array substrate of the present disclosure includes common electrode blocks 150, sensing lines 130, slits 151 overlapped with the sensing lines 130, and auxiliary electrodes 180. A first pixel electrode 171 and a second pixel electrode 172 are provided adjacent to the sensing line 130. A distance between the slit 151 and a projection of the first pixel electrode 171 into the common electrode block 150 in the direction perpendicular to the common electrode block 150 is 0.5 μm larger than that between the slit 151 and a projection of the second pixel electrode 172 onto the common electrode block 150 in the direction perpendicular to the common electrode block 150, i.e., the common electrode layer is misaligned with the pixel electrode layer.

Figure 3D:
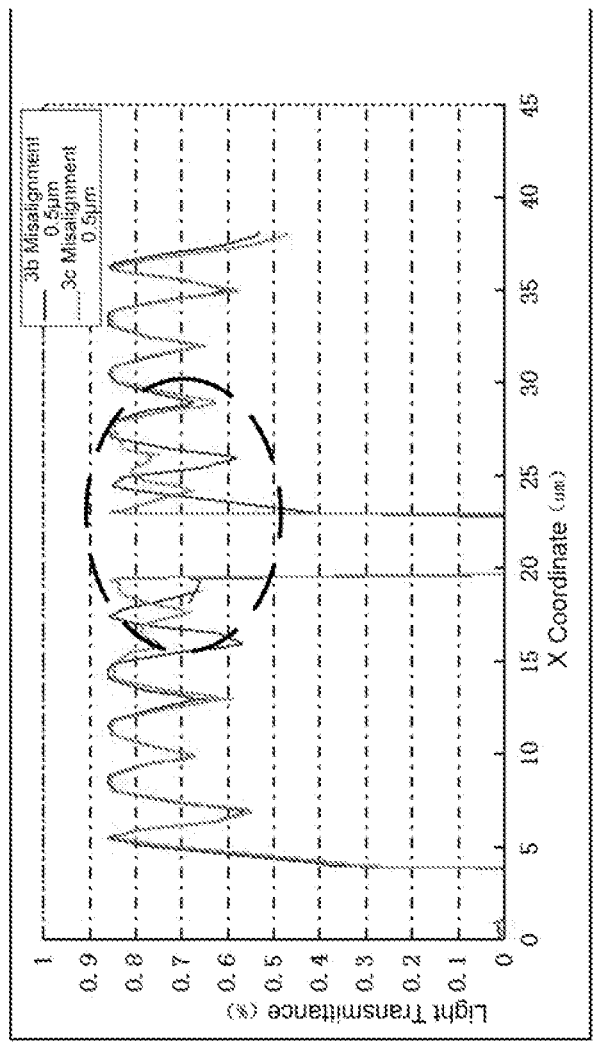
FIG. 3D is a graph comparing the light transmittance of the array substrate in FIG. 3B with the light transmittance of the array substrate in FIG. 3C.

FIG. 3D is a graph comparing the light transmittance of the array substrate n FIG. 3B with the light transmittance of the array substrate in FIG. 3C. As shown in FIG. 3D, in the existing array substrate, if the common electrode layer is misaligned with the pixel electrode layer, the light transmittance at the first pixel electrode 171 is asymmetric with that at the second pixel electrode 172, and the light transmittance at the second pixel electrode 172 is decreased, thereby decreasing the luminance of the liquid crystal display panel. However, in the array substrate provided by the present disclosure, if the common electrode layer is misaligned with the pixel electrode layer, the light transmittance at the first pixel electrode 171 is approximately symmetric with that at the second pixel electrode 172, and the light transmittance at the second pixel electrode 172 in the array substrate of the present disclosure is relatively higher than that at the second pixel electrode 172 in the existing array substrate, i.e., the light transmittance of the array substrate of the present disclosure is still uniform even if the common electrode layer is misaligned with the pixel electrode layer, thereby improving the luminance of the liquid crystal display panel.

Figure 4:
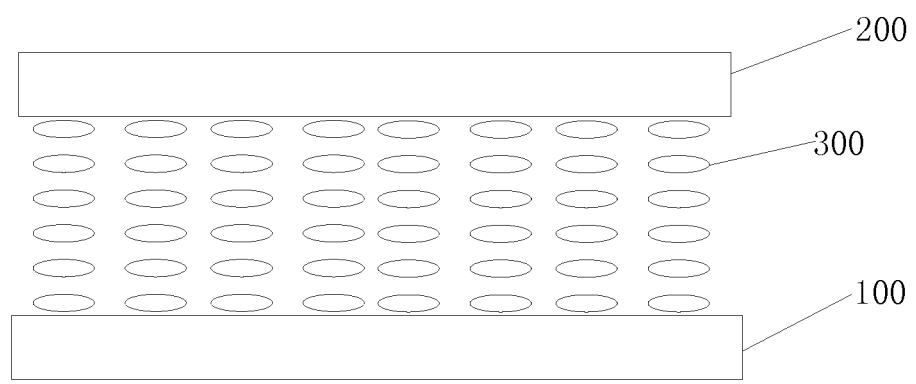
FIG. 4 is a cross-sectional view of a liquid crystal display panel, according to embodiments of the disclosure.

FIG. 4 is a cross-sectional view of a liquid crystal display panel, according to embodiments of the disclosure The liquid crystal display panel, includes a color filter substrate 200 and the array substrate 100 illustrated in any of the embodiments of the disclosure, where, a liquid crystal layer 300 is disposed between the color filter substrate 200 and the array substrate 100.

To prevent a decrease in the aperture ratio due to the sensing lines, the color filter substrate 200 is provided with a black matrix (not shown), and orthographic projections of the sensing lines of the array substrate 100 onto the color filter substrate 200 fall within the black matrix.

Figure 5:
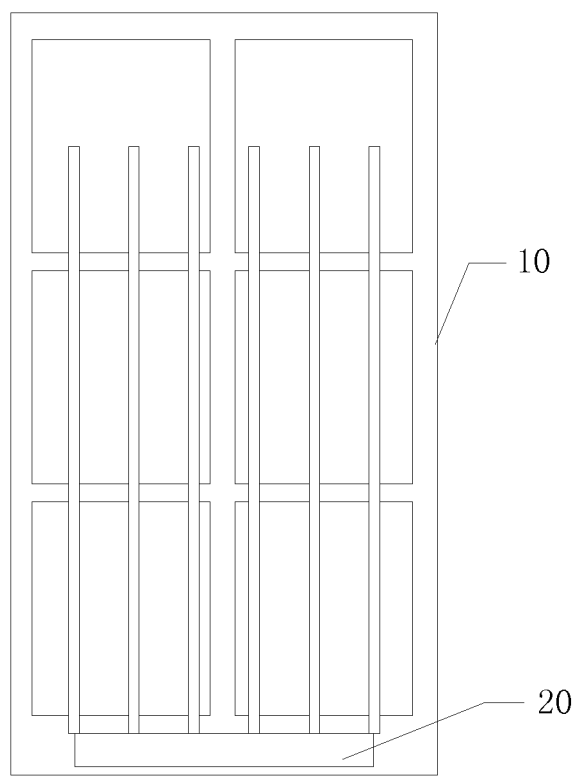
FIG. 5 is a top view of a liquid crystal display device, according to embodiments of the disclosure.

FIG. 5 is a top view of a liquid crystal display device, according to embodiments of the disclosure. The liquid crystal display device includes the liquid crystal display panel 10 illustrated in any of the embodiments of the disclosure, and a drive chip 20 configured for display driving and touch driving.

It should be noted that the above description describes embodiments and technical principles of the disclosure. The disclosure is not limited to the specific embodiments described herein, and various apparent changes, rearrangements and substitutions may be made without departing from the protective scope of the disclosure. Therefore, although the disclosure has been described in detail as above in connection with the embodiments, the disclosure is not limited thereto and may include other embodiments without departing from the conception of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. An array substrate, comprising:
   a plurality of scanning lines;
   a plurality of data lines intersected with the scanning lines;
   a plurality of pixel units defined by the data lines and the scanning lines, wherein each of the plurality of pixel units comprises a thin film transistor and a pixel electrode electrically connected with the thin film transistor;
   a plurality of common electrode blocks disposed in a layer different from the pixel electrode, the common electrode blocks being reused as touch electrodes;
   a plurality of sensing lines, each of which is electrically connected with one of the common electrode blocks; and
   a plurality of auxiliary electrodes disposed in the same layer as the pixel electrode, wherein each of the plurality of auxiliary electrodes is disposed between two adjacent pixel electrodes, and overlapped and electrically connected with one of the sensing lines.

2. The array substrate of claim 1, wherein, the auxiliary electrode is spaced from the pixel electrodes adjacent to the auxiliary electrode by an identical distance.

3. The array substrate of claim 1, wherein, each of the auxiliary electrodes is extended along an extending direction of the sensing line, and the auxiliary electrodes have a same length in the extending direction.

4. The array substrate of claim 1, wherein, a length of the auxiliary electrode in an extending direction of the sensing line is larger than or equal to that of the pixel electrode in the extending direction of the sensing line.

5. The array substrate of claim 1, wherein, a distance between the auxiliary electrode and the pixel electrode adjacent to the auxiliary electrode is larger than or equal to 2 μm.

6. The array substrate of claim 1, wherein, a common electrode layer where the common electrode blocks are located is above a metal layer where the sensing lines are located, a pixel electrode layer where the pixel electrodes are located is above the common electrode layer, a first insulation layer is disposed between the sensing line layer and the common electrode layer, and a second insulation layer is disposed between the pixel electrode layer and the common electrode layer, wherein, the auxiliary electrode is electrically connected with the sensing line overlapped by the auxiliary electrode via a slot sequentially penetrating through the second insulation layer, the common electrode layer and the first insulation layer.

7. The array substrate of claim 1, wherein the auxiliary electrode is made of a same material and formed by a same mask as the pixel electrode.

8. The array substrate of claim 1, wherein, a sensing line layer where the sensing lines are located is above a common electrode layer where the common electrode blocks are located, a pixel electrode layer where the pixel electrodes are located is above the sensing line layer, a first insulation layer is disposed between the sensing line layer and the common electrode layer, and a second insulation layer is disposed between the pixel electrode layer and the sensing line layer, wherein, the auxiliary electrode is electrically connected with the sensing line overlapped by the auxiliary electrode via a slot penetrating through the second insulation layer.

9. The array substrate of claim 1, wherein an orthographic projection of the sensing line onto the array substrate is within an orthographic projection of the data line or scanning line onto the array substrate.

10. A liquid crystal display panel, comprising: a color filter substrate, an array substrate disposed opposite to the color filter substrate, and a liquid crystal layer disposed between the color filter substrate and the array substrate, wherein, the array substrate comprising:
- a plurality of scanning lines;
- a plurality of data lines intersected with the scanning lines;
- a plurality of pixel units defined by the data lines and the scanning lines, wherein each of the plurality of pixel units comprises a thin film transistor and a pixel electrode electrically connected with the thin film transistor;
- a plurality of common electrode blocks disposed in a layer different from the pixel electrode, the common electrode blocks being reused as touch electrodes;
- a plurality of sensing lines, each of which is electrically connected with one of the common electrode blocks; and
- a plurality of auxiliary electrodes disposed in the same layer as the pixel electrode, wherein each of the plurality of auxiliary electrodes is disposed between two adjacent pixel electrodes, and overlapped and electrically connected with one of the sensing lines.

11. The liquid crystal display panel of claim 10, wherein, the color filter substrate is provided with a black matrix, and an orthographic projections of the plurality of sensing lines onto the color filter substrate are within the black matrix.

12. A liquid crystal display device, comprising a liquid crystal display panel and a drive chip configured for display driving and touch driving of the liquid crystal display panel, wherein the liquid crystal display panel comprises a color filter substrate, an array substrate disposed opposite to the color filter substrate, and a liquid crystal layer disposed between the color filter substrate and the array substrate, wherein,
the array substrate comprises:
- a plurality of scanning lines;
- a plurality of data lines intersected with the scanning lines;
- a plurality of pixel units defined by the data lines and the scanning lines, wherein each of the plurality of pixel units comprises a thin film transistor and a pixel electrode electrically connected with the thin film transistor;
- a plurality of common electrode blocks disposed in a layer different from the pixel electrode, the common electrode blocks being reused as touch electrodes;
- a plurality of sensing lines, each of which is electrically connected with one of the common electrode blocks; and
- a plurality of auxiliary electrodes disposed in the same layer as the pixel electrode, wherein each of the plurality of auxiliary electrodes is disposed between two adjacent pixel electrodes, and overlapped and electrically connected with one of the sensing lines.

* * * * *